(12) United States Patent
Rosmalen

(10) Patent No.: US 7,136,330 B2
(45) Date of Patent: Nov. 14, 2006

(54) OPTICAL DISC APPARATUS FOR RECORDING AND/OR REPRODUCING INFORMATION ON/FROM AN INFORMATION SURFACE OF A ROTATABLE OPTICAL DISC

(75) Inventor: Gerard Eduard Rosmalen, Eindhoven (NL)

(73) Assignee: Koninklijke Philips Electronics N.V., Eindoven (NL)

( * ) Notice: Subject to any disclaimer, the term of this patent is extended or adjusted under 35 U.S.C. 154(b) by 47 days.

(21) Appl. No.: 10/509,235

(22) PCT Filed: Feb. 17, 2003

(86) PCT No.: PCT/IB03/00614

§ 371 (c)(1),
(2), (4) Date: Sep. 24, 2004

(87) PCT Pub. No.: WO03/083849

PCT Pub. Date: Oct. 9, 2003

(65) Prior Publication Data

US 2005/0105409 A1    May 19, 2005

(30) Foreign Application Priority Data

Mar. 29, 2002   (EP)   .................... 02076224

(51) Int. Cl.
  *G11B 7/085*   (2006.01)
  *G11B 7/09*   (2006.01)
(52) U.S. Cl. .................................. 369/44.11
(58) Field of Classification Search ...... None
  See application file for complete search history.

(56) References Cited

U.S. PATENT DOCUMENTS

| 4,386,823 | A | * | 6/1983 | Musha ..................... 369/44.11 |
| 4,669,073 | A | * | 5/1987 | Wakabayashi et al. ... 369/44.19 |
| 4,984,225 | A | * | 1/1991 | Ando ....................... 369/13.34 |
| 5,748,579 | A | * | 5/1998 | Miyagi et al. ............ 369/44.14 |
| 6,052,357 | A |   | 4/2000 | Ogawa et al. ............. 369/215 |
| 2004/0190403 | A1 | * | 9/2004 | Nakamura et al. ....... 369/44.11 |

* cited by examiner

*Primary Examiner*—Andrea Wellington
*Assistant Examiner*—Parul Gupta

(57) ABSTRACT

An optical disc apparatus (1) for recording and/or reproducing information on/from an information surface (3) of a rotatable optical disc (5), includes a supporting assembly (7), a spindle motor (15), associated with the supporting assembly (7), having a spindle (17) with a spindle axis (19) for rotating the optical disc (5), an optical lens unit (21) associated with the supporting assembly (7) for scanning an information surface (3) of said optical disc (5) mounted on the spindle (17), and including a focussing lens assembly (23) having a focussing lens (29), a swing arm assembly (35) which is rotatable about a swing axis (39), having a movable magnetic focussing unit (45) provided near a free end (37) of the swing arm assembly (35), for driving the the movable focussing lens assembly, and consequently, the focussing lens (29) along the focussing axis (31) so as to focus the optical beam (33) on the optical disc information surface (3), and a stationary magnetic focussing unit (46) magnetically cooperating through an intermediate air gap (48) with the movable magnetic focussing unit (45). The stationary and movable magnetic focussing units (46, 45) are disposed and cooperate such that the force vector component (P) intersects a focussing lens area (27) bounded by a focussing lens periphery.

7 Claims, 3 Drawing Sheets

OPTICAL DISC APPARATUS FOR RECORDING AND/OR REPRODUCING INFORMATION ON/FROM AN INFORMATION SURFACE OF A ROTATABLE OPTICAL DISC

BACKGROUND OF THE INVENTION

1. Field of the Invention

The present invention relates to an optical disc apparatus for recording and/or reproducing information on/from an information surface of a rotatable optical disc.

2. Description of the Related Art

An optical disc apparatus of the kind indicated above is known from U.S. Pat. No. 6,052,357. This patent describes an optical disc apparatus for recording and/or reproducing information on/from an information surface of a rotatable optical disc, comprising a supporting assembly and a spindle motor, associated with the supporting assembly, having a spindle with a spindle axis for rotating the optical disc, mounted on the spindle, about the spindle axis. An optical lens unit is associated with the supporting assembly in order to scan an information surface of the optical disc mounted on the spindle. The optical lens unit comprises a focussing lens assembly having a movable focussing lens having a focussing lens area bounded by a focussing lens periphery and a focussing axis intersecting the focussing lens area, the focussing lens assembly being adapted to focus an optical beam on the information surface of the optical disc. A swing arm assembly is provided which comprises a generally elongate swing arm structure, the focussing lens assembly being mounted at a free end thereof. The swing arm assembly is rotatable about a swing axis spaced from the free end and directed generally perpendicular to the swing arm structure and generally parallel to the spindle axis and the focussing axis, such that the swing arm assembly sweeps a plane generally parallel to the information surface of the mounted optical disc, the swing arm assembly thereby causing the focussing lens assembly to scan over the information surface of the mounted optical disc. The swing arm assembly also comprises movable magnetic focussing means, near the free end of the swing arm, associated with the swing arm assembly for driving the focussing lens along the focussing axis to focus the optical beam on the optical disc information surface.

In order to focus the optical beam on the optical disc information surface, this known optical disc apparatus also comprises stationary magnetic focussing means, associated with the supporting assembly, for magnetically cooperating, through an intermediate air gap, with the movable focussing means in order to generate a magnetic force vector having a vector component parallel to the focussing axis of the focussing lens assembly so as to drive the focussing lens assembly along the focussing axis by electromagnetic force.

In this prior art optical disc apparatus, the movable magnetic focussing means comprises magnetic focussing coil means disposed in a plane which is generally parallel to the focussing axis of the focussing lens at the free end of the swing arm structure, at a location spaced from the focussing lens assembly at the remotest part of the swing arm structure as seen from the swing axis thereof. Focussing movements of the focussing lens assembly in a direction according to its focussing axis are enabled by the fact that the swing arm structure comprises two spaced elongate, generally parallel flat resilient arm elements extending between the swing axis and the focussing lens assembly, that is, interconnected at or near the free end of the swing arm assembly. The stationary magnetic focussing means cooperate with the above-mentioned magnetic coil means over an air gap which is generally parallel to the magnetic focussing coil means and, therefore, generally parallel to the focussing axis of the focussing lens.

Any magnetic force vector acting through the air gap on the focussing coil of the movable magnetic focussing means of the prior art arrangement described will exert on the focussing lens not only a force along the focussing axis, but also a perpendicular force. Moreover, these forces act on the focussing lens assembly and, therefore, on the swing arm assembly at some distance from the focussing axis of the focussing lens, resulting in force moments exerted on the resilient arm elements of the swing arm assembly. Thus, eccentric forces and moments are dynamically produced during the focussing of the focussing lens; this will produce dynamic reaction forces and moments in the swing arm assembly which may cause undue vibrations and distortions as well as added loading of the swing arm spindle. Undesirable parasitic resonance may result in the direction along the focussing axis, upsetting the automatic focussing control system of the optical lens unit. Also crosstalk may arise in the scanning direction perpendicular to the focussing direction, upsetting the automatic scanning control system.

SUMMARY OF THE INVENTION

It is an object of the invention to provide an optical disc apparatus which exhibits improved dynamic behavior by mitigating the occurrence of any undue eccentric dynamic focussing forces exerted on the movable magnetic focussing means. This object is achieved by the optical disc apparatus of the invention which comprises a supporting assembly;

a spindle motor, associated with the supporting assembly, having a spindle with a spindle axis for rotating an optical disc supported by the spindle about the spindle axis;

an optical lens unit associated with the supporting assembly for scanning an information surface of said optical disc, and comprising:

a focussing lens assembly with a focussing lens having a focussing lens area bounded by a focussing lens periphery and a focussing axis intersecting said focussing lens area, said focussing lens assembly being adapted for focussing an optical beam on said information surface;

a swing arm assembly comprising a generally elongate swing arm structure supporting said focussing lens assembly at a free end, the swing arm assembly being rotatable about a swing axis spaced from said free end and directed substantially perpendicularly to the swing arm structure and generally parallel to said spindle axis, the swing arm assembly also comprising a movable magnetic focussing means provided near said free end of the swing arm assembly for driving said focussing lens along said focussing axis so as to focus said optical beam on the optical disc information surface;

which optical disc apparatus also comprises:

a stationary magnetic focussing means associated with the supporting assembly for magnetically cooperating, through an intermediate air gap, with said movable magnetic focussing means in order to generate a magnetic force vector having a vector component parallel to said focussing axis so as to drive the focussing lens assembly along said focussing axis, and has the feature, that the stationary and movable magnetic focussing means are disposed and cooperate such that the force vector component intersects the focussing lens area. Because of this feature, the force vector will be situated near the focussing axis, thus mitigating the above problems of the prior art arrangements.

Preferably, an embodiment is used wherein the force vector component generally coincides with the focussing axis of the focussing lens. In such an embodiment particularly no eccentric forces are exerted on the focussing lens assembly.

In an optical disc apparatus of the kind in which the invention may be advantageously applied, much of the optical lens unit associated with the supporting assembly, such as the laser source and the associated optical and electronic means necessary to send data to and/or receive data from the information disc, will be located near the swing axis of the swing arm assembly so as to reduce the inertia thereof. The laser beam will travel along a section of the light path between the focussing lens assembly and the laser source which intersects the focussing axis of the focussing lens assembly perpendicularly. In an advantageous embodiment of the invention of the kind in which the laser beam intersects the focussing axis perpendicularly, the optical lens assembly comprises, near the free end of the arm assembly, a perpendicularly reflecting optical element connected to the focussing lens, having a reflective surface on the side of the focussing lens which is directed away from the information surface of a mounted optical disc and causes reflection of a laser beam travelling in the general direction between the swing axis and the focussing axis so as to travel through the focussing lens generally along the focussing axis, and the movable magnetic focussing means is connected to the reflecting element in a position in the side of the reflecting surface which is directed away from the movable focussing lens. The magnetic focussing means can thus be positioned on the focussing axis of the focussing lens.

The previous embodiment may be advantageously combined with a further embodiment of the invention, wherein the swing arm assembly is bounded by spaced virtual parallel flat planes extending perpendicularly to the swing axis, a first plane being nearer to a mounted optical disc and a second plane being more remote from a mounted optical disc; at least a portion of the reflecting element is inwardly spaced from the second plane, so that an intermediate space is provided between the reflecting element and the second plane, and the stationary magnetic focussing means extends into the intermediate space between the reflecting element and the second plane, thus occupying at least a portion of the intermediate space. This embodiment will contribute to minimizing the space requirements for the movable and stationary magnetic focussing means. Reduction of the overall dimension of optical disc apparatus, particularly for data storage, is highly desirable in order to increase the field of use to the incorporation in ever smaller information technology and communications devices. Interesting in this respect is a further embodiment, wherein the movable and stationary magnetic focussing means cooperate through an air gap which is generally parallel to the reflecting surface of the reflecting element.

To minimize the inertia of the optical lens unit and the overall dimensions of the optical disc apparatus, the latter embodiment may be combined with a further embodiment, wherein the reflecting surface of the focussing lens assembly is disposed in an inclined plane relative to the swing axis of the swing arm assembly, the movable electrical magnetic coil means being disposed generally in an inclined plane parallel to the reflecting surface, and the stationary magnetic circuit means comprising an inclined face directed towards the movable electrical magnetic coil means, such that the air gap between the movable electrical magnetic coil means and the stationary magnetic circuit means is disposed in an inclined plane generally parallel to the inclined reflective surface of the focussing lens assembly.

To reduce the inertia of the swing arm assembly and to provide resilient guidance means for the focussing lens assembly, in a further embodiment of the invention, the swing arm structure comprises two spaced elongate generally parallel flat resilient arm elements which extend between the swing axis and the focussing lens assembly and are interconnected at or near the free end of the swing arm assembly by the focussing lens assembly.

BRIEF DESCRIPTION OF THE DRAWINGS

The objects and features of the present invention will become more apparent by referring to the following non-limiting description of a preferred embodiment, given with reference to the accompanying drawings in which.

The drawings are of a schematic nature and intended for illustrative purposes only. The details in the figures are drawn to an arbitrary scale which may be different from the overall scale. The same components are indicated by the same reference number throughout the figures. Components and assemblies which may be configured according to principles which are basically known from the prior art will not be discussed in detail.

DESCRIPTION OF THE PREFERRED EMBODIMENTS

Figure 1:
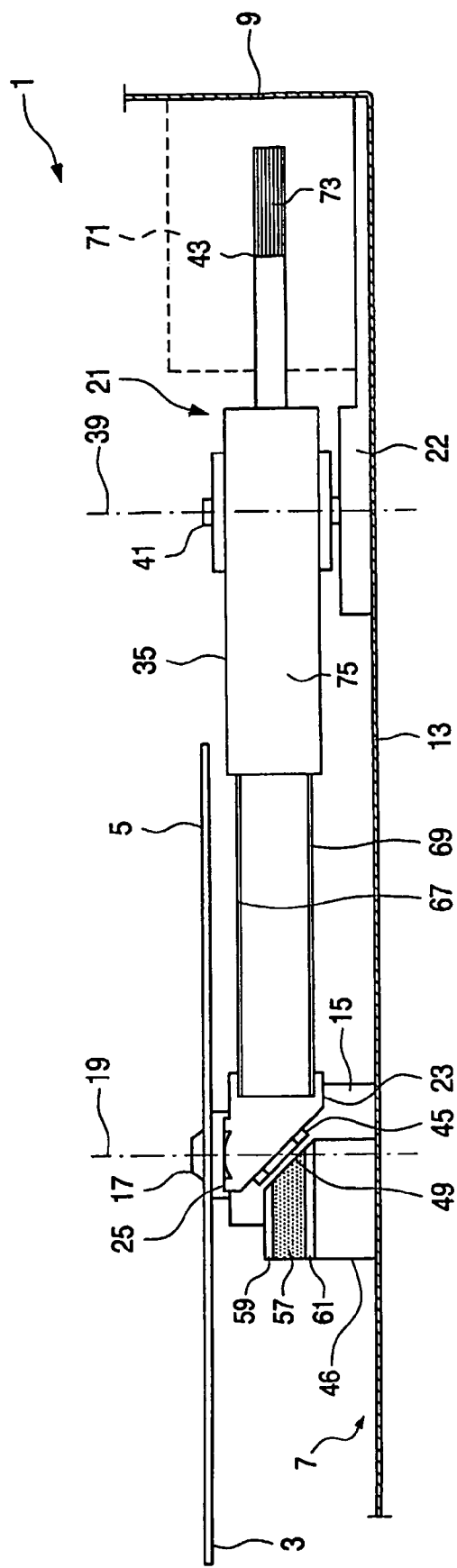
FIG. 1 is a schematic side elevation of an embodiment of an optical disc apparatus according to the invention.
Figure 2:
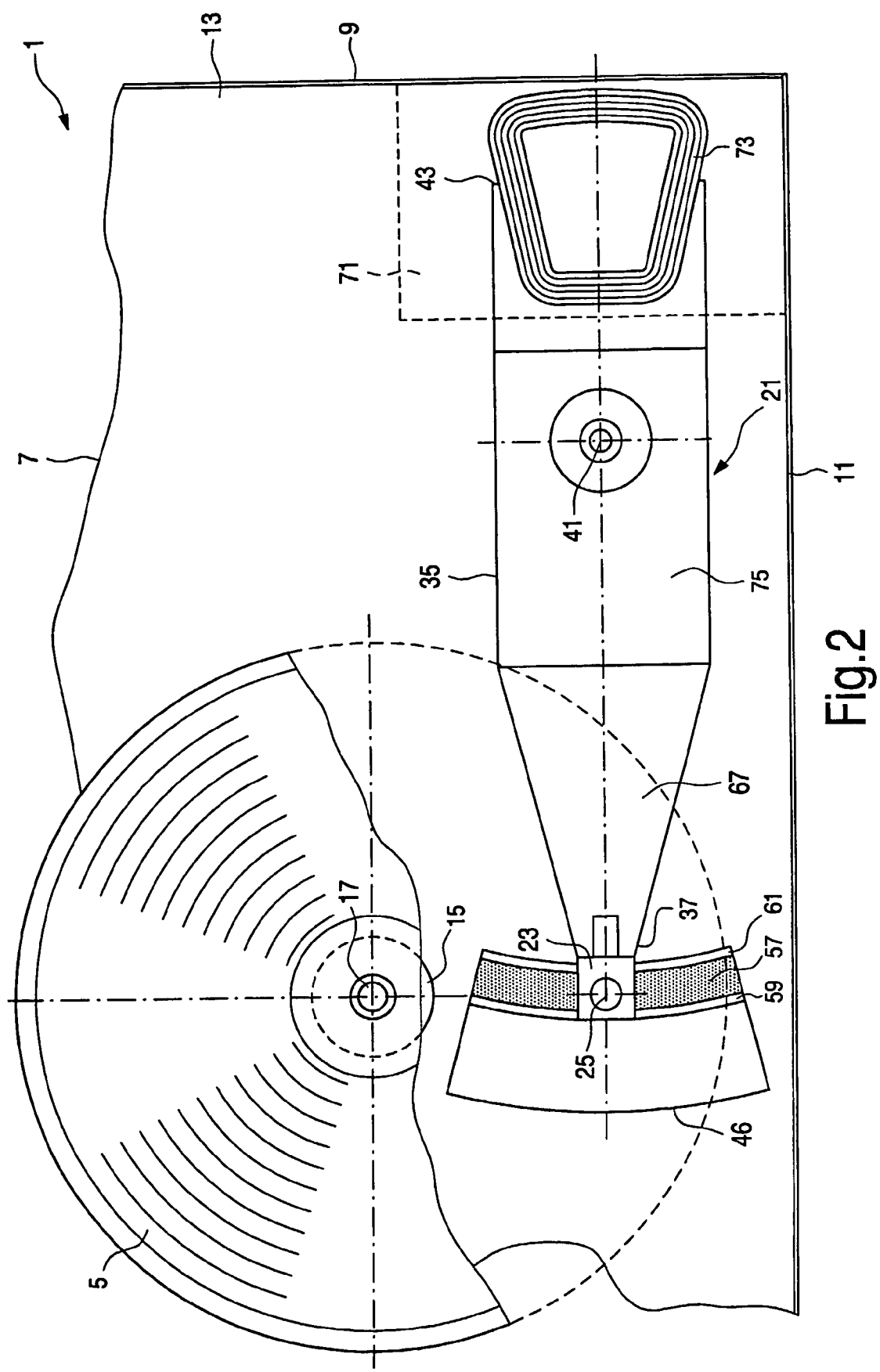
FIG. 2 is a plan view of a section of the optical disc apparatus of FIG. 1.

FIGS. 1 and 2 show an overall configuration of an optical disc apparatus 1 for recording and/or reproducing information on/from an information surface 3 of a rotatable optical disc 5. The apparatus comprises a supporting assembly 7 with side walls 9, 11 and a bottom wall 13. The supporting assembly is only partly shown and may be of an arbitrary configuration, but in many cases it will be generally box shaped. A spindle motor 15 is provided on the bottom wall 13 of the supporting assembly 7; this motor has a spindle 17 with a spindle axis 19 for rotating the optical disc 5 about the spindle axis 19. The optical disc may be mounted on or put on and/or clamped to the spindle.

An optical lens unit 21 is provided on a raised part 22 provided on the bottom surface 13 of the supporting assembly 7 in order to scan the information surface 3 on the bottom side of the optical disc 5 mounted on the spindle 17. The optical lens unit 21 comprises a movable focussing lens assembly, generally referred to as 23, having a focussing lens 25 with a focussing lens area 27 bounded by a focussing lens periphery 29 and a focussing axis 31 intersecting the focussing lens area, the movable focussing lens assembly 23 being adapted for focussing an optical beam 33 on the information surface 3 of the optical disc 5. The focussing axis 31 is substantially parallel to the spindle axis 19.

A swing arm assembly 35 is provided which is configured as a generally elongate swing arm structure supporting the movable focussing lens assembly 23 at a free end 37. The swing arm assembly is rotatable about a swing axis 39 spaced from the free end 37 and directed generally perpendicularly to the swing arm structure and generally parallel to the spindle axis 19 and the focussing axis 31, such that the swing arm assembly 35 sweeps a plane generally parallel to the information surface 3 of the mounted optical disc 5, the swing arm assembly 35 thereby causing the movable focussing lens assembly 23 to scan over the information surface 3 of the mounted optical disc 5. In the embodiment shown in the drawings, a swing arm spindle 41 is provided for the swing arm assembly on the raised part 22. The swing arm assembly has a generally two-armed configuration having a second free end 43 remote from the free end 37. The spindle 41 is disposed between the free ends 37 and 43.

Figure 3:
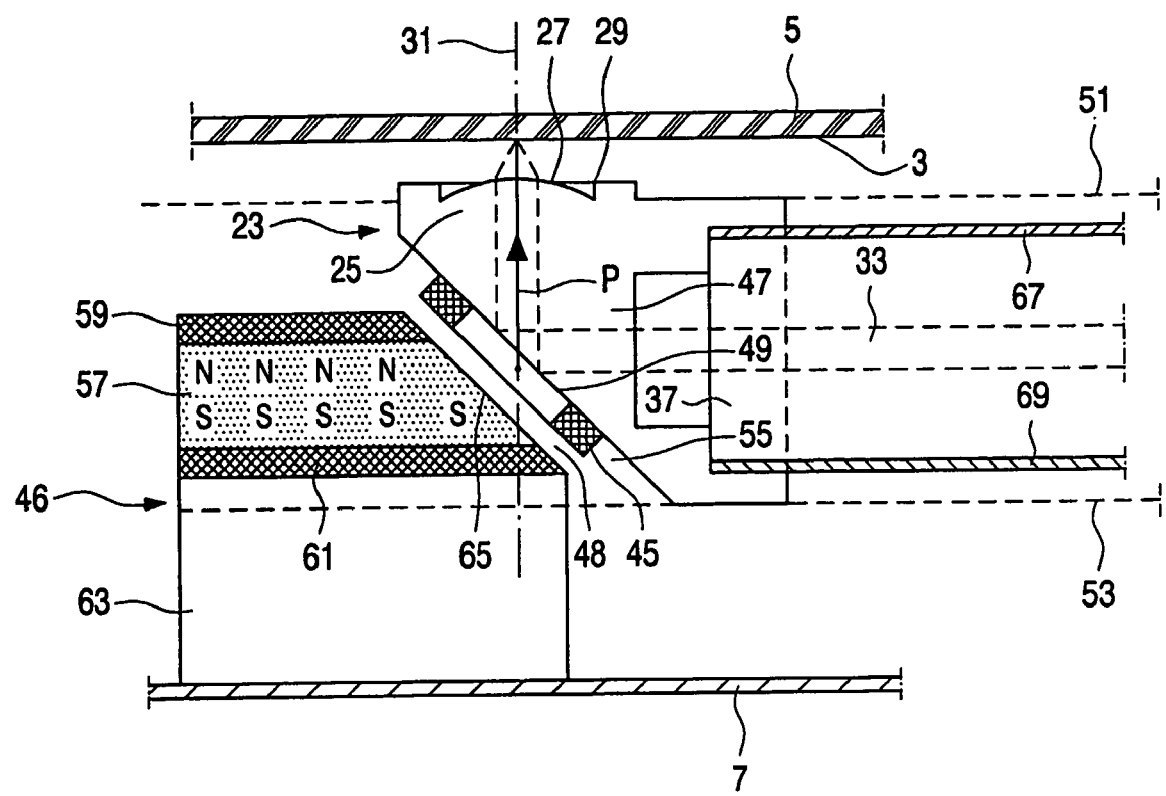
FIG. 3 is an enlarged schematic side elevation a in cross-sectional view showing details of the focussing lens assembly and the associated movable and stationary magnetic focussing means of the optical disc apparatus of the FIGS. 1 and 2.

The swing arm assembly 35 also comprises movable magnetic focussing means 45 provided near the free end 37 for electromagnetically driving the movable focussing lens assembly and, consequently, the focussing lens 25 along the focussing axis 31 so as to focus the optical beam 33 on the optical disc information surface 3. In the present embodiment, the moving magnetic focussing means consists, in a manner which is known per se, of a generally annular focussing coil 45 having turns of conductive wire, such as copper wire. The focussing coil 45 may have a generally oval or rectangular shape, such as is well known in the art, and is shown in a cross sectional view in FIG. 3.

The optical disc apparatus 1 also comprises stationary magnetic focussing means 46 associated with the supporting assembly 7 for magnetically cooperating, through an intermediate air gap 48, with the movable magnetic focussing means 45 so as to generate a magnetic force vector having a vector component P parallel to the focussing axis 31, thus driving the movable focussing lens assembly 23 along the focussing axis 31. In the present embodiment, the stationary magnetic focussing means consists, in a manner well known in the art, of a vertically-magnetized permanent magnet 57 bounded by ferromagnetic flux concentrating upper and lower yoke plates 59 and 61, respectively, which are mounted on a lower support of a suitable magnetically isolating material.

The stationary and movable magnetic focussing means 45, 46 are disposed and cooperate such that the force vector component P intersects the focussing lens area 27 bounded by the focussing lens periphery 29. In fact, in the embodiment shown in the drawings, the force vector component P generally coincides with the focussing axis 31 of the focussing lens 27.

The optical lens assembly 23 comprises, near the free end 37 of the arm assembly, a perpendicularly reflecting optical element 47 which is connected to the focussing lens 27 and is integral therewith in the present embodiment; it is made of an optical grade transparent synthetic resin material so as to form an integral optical component having a reflecting surface 49 on one side which reflects the optical beam 33 by total inner reflection. This reflective surface 49 is disposed on the side of the focussing lens 25 which is directed away from the information surface 3 of a mounted optical disc 5 and causes reflection of the laser beam 33, travelling in the general direction between the swing axis 39 and the focussing axis 31, so as to travel through the focussing lens 25 generally along the focussing axis 31. The movable magnetic focussing means 45 is connected to the reflecting element 47 in a position on the side of the reflecting surface 49 which is directed away from the focussing lens 25.

The swing arm assembly is bounded by spaced virtual parallel flat planes 51, 53 (symbolically shown as dashed lines in section in FIG. 3) extending perpendicularly to the swing axis 39, a first plane 51 being nearer to a mounted optical disc 5 and a second plane 53 being more remote from a mounted optical disc 5.

The reflecting element 47 is inwardly spaced from the second plane 53 so that an intermediate space 55 is provided between the reflecting element 47 and the second plane 53. The stationary magnetic focussing means 46 extends into this intermediate space 55 between the reflecting element 47 and the second plane 53, thus occupying a portion of the intermediate space 55.

The movable and stationary magnetic focussing means 45, 46 cooperate through an air gap 48 which is generally parallel to the reflecting surface 49 of the reflecting element 47. In fact, the focussing coil 45 is fixed on the outer surface of the reflecting element 47 using a suitable adhesive material which does not degrade the inner reflective properties of the reflective surface 49. Preferably, the reflecting surface 49 is optically isolated by a suitable material such as a metal layer deposited by vacuum deposition.

The reflecting surface 49 of the focussing lens assembly 23 is disposed in an inclined plane relative to the swing axis 39 of the swing arm assembly 35. The movable electrical magnetic coil means 45 is disposed generally in an inclined plane parallel to the reflecting surface 49 and the stationary magnetic circuit means 46 comprise an inclined face 65 directed towards the movable electrical magnetic coil means 45, such that the air gap 48 between the movable electrical magnetic coil means 45 and the stationary magnetic circuit means 46 is disposed in an inclined plane generally parallel to the inclined reflective surface 49 of the movable focussing lens assembly 23.

The swing arm structure comprises two spaced elongate generally parallel flat resilient arm elements 67, 69 which extend between the swing axis 39 and the movable focussing lens assembly 23 and are interconnected at or near the free end 37 of the swing arm assembly 35 by the movable focussing lens assembly 23.

At the end of the swing arm structure which is remote from the movable focussing lens assembly 23, a magnetic system of a general kind known per se from the prior art is provided to drive the swinging movements of the swing arm assembly 35 about the intermediate swing axis 41. This magnetic system is not in itself part of the invention and, therefore, is not shown in detail in the drawings. It comprises an electrical coil 73 attached to the free end 43 of the swing arm structure, as well as a cooperating stationary permanent magnetic circuit associated with the supporting assembly 7. This circuit is denoted merely symbolically in the drawings by dashed lines and bears the general reference number 71.

The central part 75 of the swing arm assembly 35 may be hollow and box-shaped and may contain components of the optical system cooperating with the movable focussing lens assembly 23 and the reflecting surface 3 of the optical disc 5, such as a semiconductor laser generating the laser beam 33, as well as further associated optical and electronic means for modifying the properties and the direction of the laser beam, for processing signals, etc.

Thus, an optical disc apparatus has been described according to a best mode for carrying out the invention contemplated by the inventor at the time of writing the present specification. It will be appreciated by persons skilled in the art that the invention is not limited by what has been specifically described and shown above. Many modifications are possible without departing from the inventive concepts disclosed herein. The swing arm assembly need not be of the two-arm type but could be of the one-arm type having its swing axis situated at one end of the swing arm assembly. The movable focussing lens assembly need not be suspended in leaf springs of a swing arm structure. Instead the swing arm structure could be rigid and the movable focussing lens assembly could be mounted resiliently on the rigid structure. The total height dimension of the optical disc apparatus could be reduced by suitable measures to reduce the heights of the raised portion 22 of the arm spindle support as well as of the support 63 of the stationary magnetic means 46 as much as possible. If minimal overall dimensions are preferred, preferably the whole swing arm assembly could be comprised between the virtual planes 51, 53 of the swing arm structure. The integrated focussing lens assembly could be replaced by a multiple component assembly including a separate mirror having an exterior reflective surface instead of the inner totally reflecting surface 49. The movable magnetic focussing means could be disposed in a plane other than the plane of the reflecting surface 49 and at a different angle. For example, use could be made of a vertically disposed magnetic coil located beneath the focussing lens assembly 23 cooperating with a stationary magnetic circuit having a central vertical curved slot in which the magnetic coil can move.

The invention claimed is:

1. An optical disc apparatus for recording and/or reproducing information, comprising:
   a supporting assembly;
   a spindle motor, associated with the supporting assembly, having a spindle with a spindle axis for rotating an optical disc supported by the spindle about the spindle axis; and
   an optical lens unit associated with the supporting assembly for scanning an information surface of said optical disc, said optical lens unit comprising:
   a focussing lens assembly with a focussing lens having a focussing lens area bounded by a focussing lens periphery and a focussing axis intersecting said focussing lens area, said focussing lens assembly being adapted for focussing an optical beam on said information surface; and
   a swing arm assembly comprising a generally elongate swing arm structure supporting said focussing lens assembly at a free end, the swing arm assembly being rotatable about a swing axis spaced from said free end and directed substantially perpendicularly to the swing arm structure and generally parallel to said spindle axis, the swing arm assembly also comprising a movable magnetic focussing means provided near said free end of the swing arm assembly for driving said focussing lens along said focussing axis so as to focus said optical beam on the optical disc information surface,
   the optical disc apparatus also comprising:
   a stationary magnetic focussing means associated with the supporting assembly for magnetically cooperating, through an intermediate air gap, with said movable focussing means in order to generate a magnetic force vector having a vector component parallel to said focussing axis so as to drive the focussing lens assembly along said focussing axis,
   wherein the stationary magnetic focusing means and the movable magnetic focussing means are disposed and cooperate such that said force vector component intersects said focussing lens area, and
   wherein the optical lens assembly comprises, near said free end of the arm assembly, a perpendicularly-reflecting optical element connected to the focussing lens, said perpendicularly-reflecting optical element having a reflective surface facing a side of the focussing lens situated away from the information surface of the optical disc, when supported by the spindle, and causing reflection of a laser beam travelling in a general direction between the swing axis and the focussing axis so as to travel through the focussing lens generally along the focussing axis, and
   wherein the movable magnetic focussing means is connected to the perpendicularly-reflecting optical element in a position on a side of said perpendicularly-reflecting optical element opposite from said reflecting surface.

2. The optical disc apparatus as claimed in claim 1, wherein said force vector component generally coincides with the focussing axis of said focussing lens.

3. The optical disc apparatus as claimed in claim 1, wherein:
   the swing arm assembly is bounded by spaced virtual parallel flat planes extending perpendicularly to the swing axis, a first plane being nearer to the optical disc, when supported by the spindle, and a second plane being more remote from said optical disc;
   at least a portion of the reflecting element is inwardly spaced from said second plane thereby forming an intermediate space between the perpendicularly-reflecting optical element and said second plane; and
   the stationary magnetic focussing means extends into said intermediate space between the perpendicularly-reflecting optical element and said second plane, thus occupying at least a portion of said intermediate space.

4. The optical disc apparatus as claimed in claim 2, wherein the movable magnetic focussing means and the stationary magnetic focussing means cooperate through the intermediate air gap, said intermediate air gap being generally parallel to said reflecting surface of the perpendicularly-reflecting optical element.

5. The optical disc apparatus as claimed in claim 1, wherein the stationary magnetic focussing means is configured as arcuate permanent magnetic circuit means, and the movable magnetic focussing means is configured as electrical magnetic coil means.

6. The optical disc apparatus as claimed in claim 5, wherein:
   the reflecting surface of the perpendicularly-reflecting optical element in the focussing lens assembly is disposed in an inclined plane relative to the swing axis of the swing arm assembly;
   said movable electrical magnetic coil means is disposed generally in an inclined plane parallel to the reflecting surface; and
   said stationary magnetic circuit means comprises an inclined face directed towards said movable electrical magnetic coil means, such that the said intermediate air gap between said movable electrical magnetic coil means and said stationary magnetic circuit means is disposed in an inclined plane generally parallel to said inclined reflective surface of the perpendicularly-reflecting optical element in the focussing lens assembly.

7. The optical disc apparatus as claimed in claim 1, wherein the swing arm structure comprises two spaced elongate generally parallel flat resilient arm elements extending between the swing axis and the focussing lens assembly, said arm elements being interconnected at or near the free end of the swing arm assembly by the focussing lens assembly.

* * * * *